United States Patent [19]
Kruse et al.

[11] Patent Number: 5,518,091
[45] Date of Patent: May 21, 1996

[54] SLIDE VALVE FOR CONTROLLING A BRIDGING CLUTCH IN AN AUTOMATIC TRANSMISSION

[75] Inventors: Georg Kruse, Gifhorn; Gerhard Preine, Braunschweig; Ulrich Remmlinger, Braunschweig; Volker Pichmann, Braunschweig, all of Germany

[73] Assignee: Volkswagen AG, Wolfsburg, Germany

[21] Appl. No.: 161,774

[22] Filed: Dec. 2, 1993

[30] Foreign Application Priority Data

Dec. 3, 1992 [DE] Germany .......................... 42 40 640.4
Aug. 25, 1993 [DE] Germany .......................... 43 28 503.1
Oct. 30, 1993 [DE] Germany .......................... 43 37 167.1

[51] Int. Cl.⁶ ..................................................... F16D 33/12
[52] U.S. Cl. ............................... 192/3.29; 192/85 R
[58] Field of Search ............................. 192/3.29, 3.33, 192/85 R

[56] References Cited

U.S. PATENT DOCUMENTS 3,674,121  7/1972  Copeland ........................... 192/85 R X
3,929,211  12/1975  Maddock ........................... 192/85 R X
5,054,590  10/1991  Paulsen ............................ 192/3.29 X
5,058,716  10/1991  Lippe et al. ...................... 192/3.33
5,145,045  9/1992  Wakahara .......................... 192/3.29
5,163,540  11/1992  Mainquist et al. ................ 192/3.29 X
5,339,935  8/1994  Ishii et al. ...................... 192/3.3
5,343,990  9/1994  Iizuka ............................. 192/3.33 X

FOREIGN PATENT DOCUMENTS 4203323  8/1992  Germany .

Primary Examiner—Andrea L. Pitts
Attorney, Agent, or Firm—Brumbaugh, Graves, Donohue & Raymond

[57] ABSTRACT

A slide valve for controlling a torque converter bridging clutch for an automatic transmission of a motor vehicle includes a slide housing and a movable control slide by which hydraulic fluid connections and ports may be connected to each other in different ways. The slide includes a first control flange for alternatively or jointly controlling closing and opening lines leading to the converter bridging clutch. To ensure optimal regulation of the converter bridging clutch, the slide has a second control flange for selectively connecting the opening line to a drain port so that the hydraulic fluid can flow continually through the converter bridging clutch to remove heat.

15 Claims, 5 Drawing Sheets

5,518,091

SLIDE VALVE FOR CONTROLLING A BRIDGING CLUTCH IN AN AUTOMATIC TRANSMISSION

BACKGROUND OF THE INVENTION

This invention relates to slide valves for controlling a bridging clutch in an automatic transmission.

A slide valve of this kind is disclosed in German Offenlegungsschrift No. 42 03 323. In that disclosure, a slide valve, which is merely represented symbolically in the drawing, controls a bridging clutch associated with a hydraulic torque converter.

SUMMARY OF THE INVENTION

It is an object of the present invention to provide a slide valve for controlling a bridging clutch in an automatic transmission which overcomes the disadvantages of the prior art.

Another object of the invention is to provide a slide valve of this type having a compact construction which is especially dependable in operation.

These and other objects of the invention are attained by providing a slide valve for supplying hydraulic fluid to the closing line and the opening line of a bridging clutch for an automatic transmission having a slide with a control flange by which the fluid supply to both the opening line and closing line is controlled and having a second flange by which the clutch opening line may be connected to a drain outlet.

According to the invention, the first control flange of the slide may control the opening line and the closing line either alternatively or together to operate the bridging clutch. The width of the first control flange is selected in proportion to the distance between the opening line and the closing line and a pressure port delivering the converter pressure so that, if the control slide is shifted continuously, the converter pressure can be shifted gradually from the opening line to the closing line and vice versa. After passing through the bridging clutch, the hydraulic medium may be directed to a sump by way of a drain associated with the bridging clutch. Alternatively, however, the closing line coming from the bridging clutch may be connectable by means of a bipartite control flange on the slide to a drain port leading to the sump. In that case, a hydraulic connecting line in the torque converter containing the bridging clutch may be omitted, with a saving of available space.

With a view to especial ease of fabrication and installation, the slide valve housing according to the invention may include a pressure plate at one end of the slide which forms part of a pressure chamber connected through a control passage to a hydraulic pressure line. By providing a third control flange on the slide, an especially fine adjustment of the bridging clutch can be introduced. It should be particularly emphasized that, with the slide valve according to the invention, hydraulic fluid flows constantly through the bridging clutch in the process of controlling it. In this way, the heat generated by friction during the slip mode of the clutch can be carried away continually. Thus, the switch valve according to the invention makes it possible to place a high thermal load on the bridging clutch in an extremely confined space.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
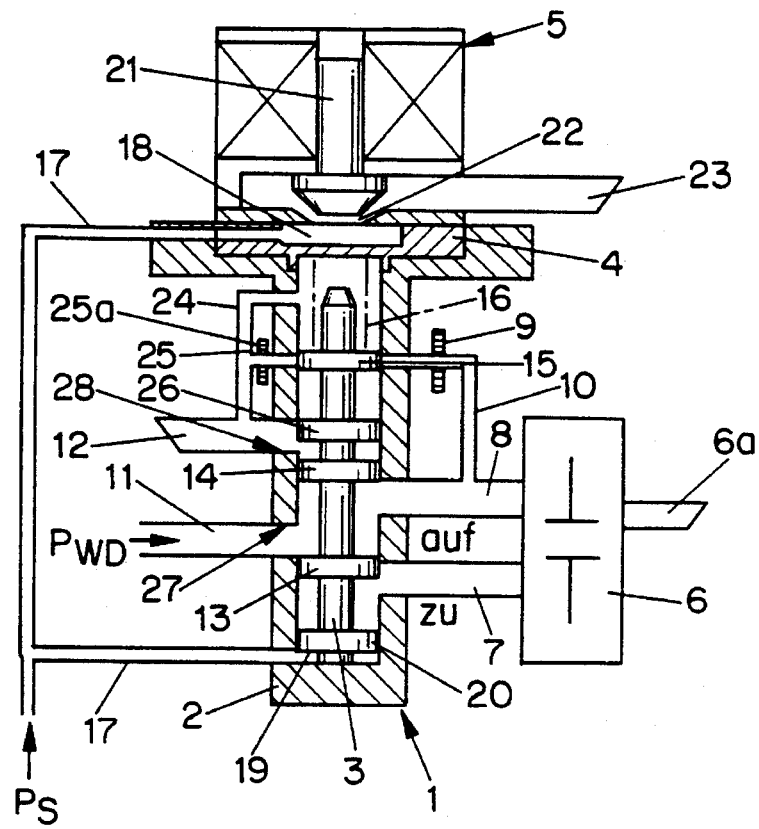
FIG. 1 is a longitudinal sectional schematic view illustrating a first representative embodiment of a slide valve according to the invention showing the control slide in a position in which no control pressure acts on the slide.

In all of the illustrations, like parts are designated by the same reference numerals.

In the typical embodiment shown in FIG. 1, a slide valve 1 includes a slide housing 2, a control slide 3 slidable in the housing, a pressure plate 4 at one end of the housing, and an electromagnet valve 5 mounted on the pressure plate. A conventional bridging clutch 6, shown schematically in the drawings, used in the operation of a torque converter of an automatic transmission (not shown), is connected to the slide valve 1 through a closing line 7 and an opening line 8, and has a drain 6a. The flow of hydraulic fluid through the bridging clutch takes place in a conventional manner by passing through a small orifice in an actuating piston in the bridging clutch. The torque converter and the bridging clutch 6 are both mounted in a housing in the usual manner. A branch line 10 provided with a first throttle 9 leads from the opening line 8 back to the slide valve 1. The hydraulic fluid pressure $P_{WD}$ required to actuate the bridging clutch 6 is supplied to the slide valve 1 through a pressure supply port 11. A drain port 12 leads into a sump (not shown) for the hydraulic fluid, permitting a pressure drop in the bridging clutch 6 and corresponding displacement of the control slide 3.

To regulate the pressure in the bridging clutch 6, a first control flange 13 and a second control flange 14 are provided on the slide 3. A compression spring 16 extends between a third control flange 15 and the pressure plate 4 which is pressed into the slide valve housing. A control pressure line 17, to which a hydraulic pressure $P_S$ is applied, connects a pressure chamber 18 beneath the electromagnet valve 5 in the pressure plate 4 to a control pressure chamber 19 enclosed by a fourth control flange 20 at the opposite end of the slide 3. Whenever a plunger 21 in the electromagnet valve 5 closes an opening 22 leading from the control pressure chamber 19, the full control pressure $P_S$ is maintained in the control pressure chamber 19. The electromagnet valve 5 in this embodiment is chosen so that closing of the opening 22 is possible only when current is applied to the electromagnet. In this way, the bridging clutch 6 will always be open in case of a power failure. Opening of the aperture 22 by lifting of the plunger 21 causes the pressure in the chamber 18 and the line 17 to be reduced from the level $P_S$ because the electromagnet valve 5 has a vent 23 leading from the opening 22 to atmospheric pressure. A first branch vent 24 and a second branch vent 25 also lead from the valve housing to atmospheric pressure through the drain port 12. The vent 25 has a throttle 25a and is effective in connection with a fifth control flange 26 of the slide 3 as described hereinafter.

In the initial position of the slide as seen in FIG. 1, the plunger 21 is in the open position so that no pressure can build up in the control chamber 19. Consequently, the slide 3 is urged by the compression spring 16 against the lower end of the passage in the slide housing 2 as seen in the drawing. In this initial position, the pressure $P_{WD}$ is supplied to the opening line 8 from the pressure supply port 11. In this condition, the bridging clutch 6 is kept open and therefore does not transmit any torque. Application of current to the electromagnet valve 5, which can be either a proportional valve or an on-off type of valve, closes the opening 22 so that a pressure can build up gradually in the control chamber 19, causing displacement of the control slide 3 against the action of the compression spring 16. This displacement of the control slide 3 in the upward direction as seen in the drawing continues until the first control flange 13 reaches a first control edge 27. In this position of the slide 3, the pressure supply $P_{WD}$ is completely cut off from the opening line 8 and is completely opened to the closing line 7. As shown in FIG. 1, the width of the first control flange 13 is selected with respect to the width of the pressure supply port 11 so that the pressure supply to the opening line 8 is decreased as the flange 13 moves toward the first control edge 27 to the same extent as the pressure applied to the closing line 7 is increased. In this way, the flow of the pressure $P_{WD}$ through the slide valve 1 to the drain 6a is diverted without interruption from the opening line 8 to the closing line 7. The bridging clutch 6 is thus gradually closed. The third control flange 15 on the slide 3 has a larger cross-sectional area than the control flanges 13, 14, 20 and 26, thus providing a differential pressure surface. Upon upward displacement of the control slide 3, the pressure applied through the branch line 10 produces a greater upward force on the flange 15 than the downward force on the smaller flange 26 and, together with the upward force from the pressure generated in the control pressure chamber 19, balances the counteracting downward force of the compression spring 16.

A second pressure-regulating position is reached when the bottom of the second control flange 14, as seen in the drawing, reaches a second control edge 28. This causes the first control flange 13 and the second control flange 14 to connect the opening line 8 to the drain port 12. The pressure in the opening line 8 is thus reduced, permitting application of the normal closing force in the bridging clutch 6, so that it is able to transmit a torque. As the gap between the second control edge 28 and the second control flange 14 increases, the pressure in the opening line 8 thus becomes less and less.

Figure 2:
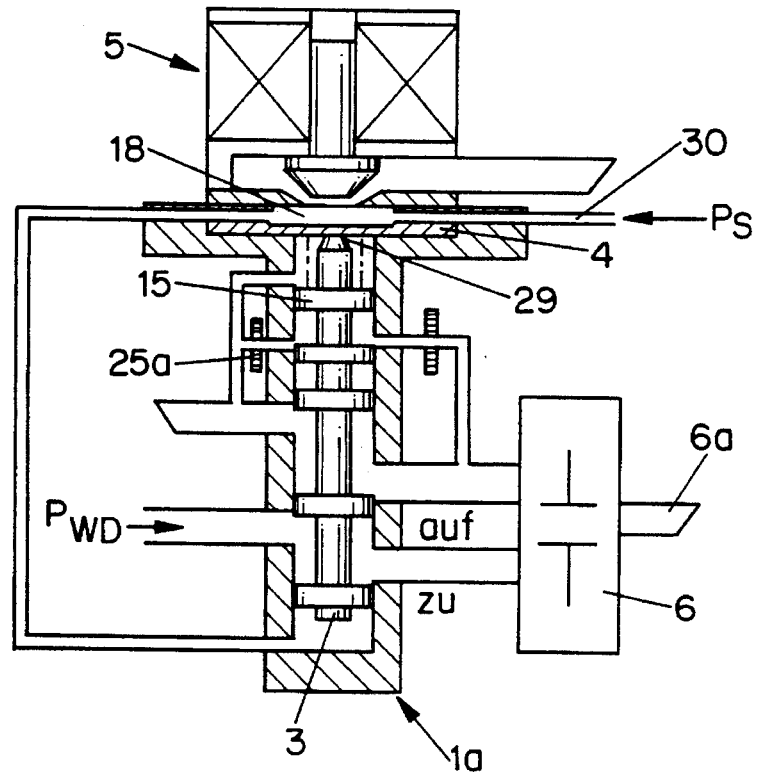
FIG. 2 is a longitudinal sectional schematic view showing a second representative embodiment of the invention which is slightly modified relative to the first embodiment with the control slide shown in a stopped position in which the maximum control pressure acts on the slide.

FIG. 2 shows a slide valve 1a which differs from the slide valve 1 in the manner described hereinafter. In the uppermost position of the slide 3 as seen in FIG. 2, the torque transmitted by the bridging clutch 6 reaches a maximum. In this position, a stop surface 29 of the control slide 3 abuts the pressure plate 4. The pressure plate 4 thus provides the functions of sealing, slide travel limitation and an abutment for the compression spring 16. Furthermore, the pressure plate also serves as a mounting for the electromagnet valve 5. By integration of these functions, an especially short structure is thus achieved for both the slide valve 1 of FIG. 1 and the slide valve 1a of FIG. 2. In both cases, the pressure medium applied to the bridging clutch 6 by the closing line 7 returns to the sump for the hydraulic fluid through the drain 6a.

In contrast to the embodiment shown in FIG. 1, the control pressure $P_S$ is supplied in the embodiment of FIG. 2 through an inlet 30 which leads directly to the pressure chamber 18. However, the mode of operation of the slide valve 1a represented in FIG. 2 is exactly the same as that of the slide valve 1 shown in FIG. 1. In FIG. 2, it is evident that, at full torque transmission, a flow of pressure medium through the bridging clutch 6 is always assured. This is important especially when heat is generated in the bridging clutch by friction in slip mode. The heat can be carried off continually by the continual through-flow of hydraulic fluid so that the bridging clutch 6 can withstand a high thermal stress.

The effect of the differential pressure surface on the third control flange 15 should also be noted. This assures that the Bernoulli effect produced by fluid flow in the aperture between the second control flange 14 and the second control edge 28 will not shift the control slide 3 hydrodynamically. The additional differential force applied by the flange 15 against the force of the compression spring 16 assures that displacement of the control slide 3 will occur only at selected control pressures, so that any desired torque of the bridging clutch 6 can be very finely adjusted. This fine adjustability is especially important when the operation of the bridging clutch 6 is regulated.

The slide valves 1 and 1a can be integrated especially well into pre-existing slide valve arrangements for hydraulic control systems. In particular, by arranging the electromagnet valve in a line with the control slide 3, an easily assembled and generally compact unit is obtained. It should be emphasized at this point that the internal bores in the slide valve housing 2 can be carried out at one machining station using the same bore spindle. The larger bore required for the larger control flange 15 requires only a change of boring tool. Hence, the overall costs of fabrication are very low.

Figure 3:
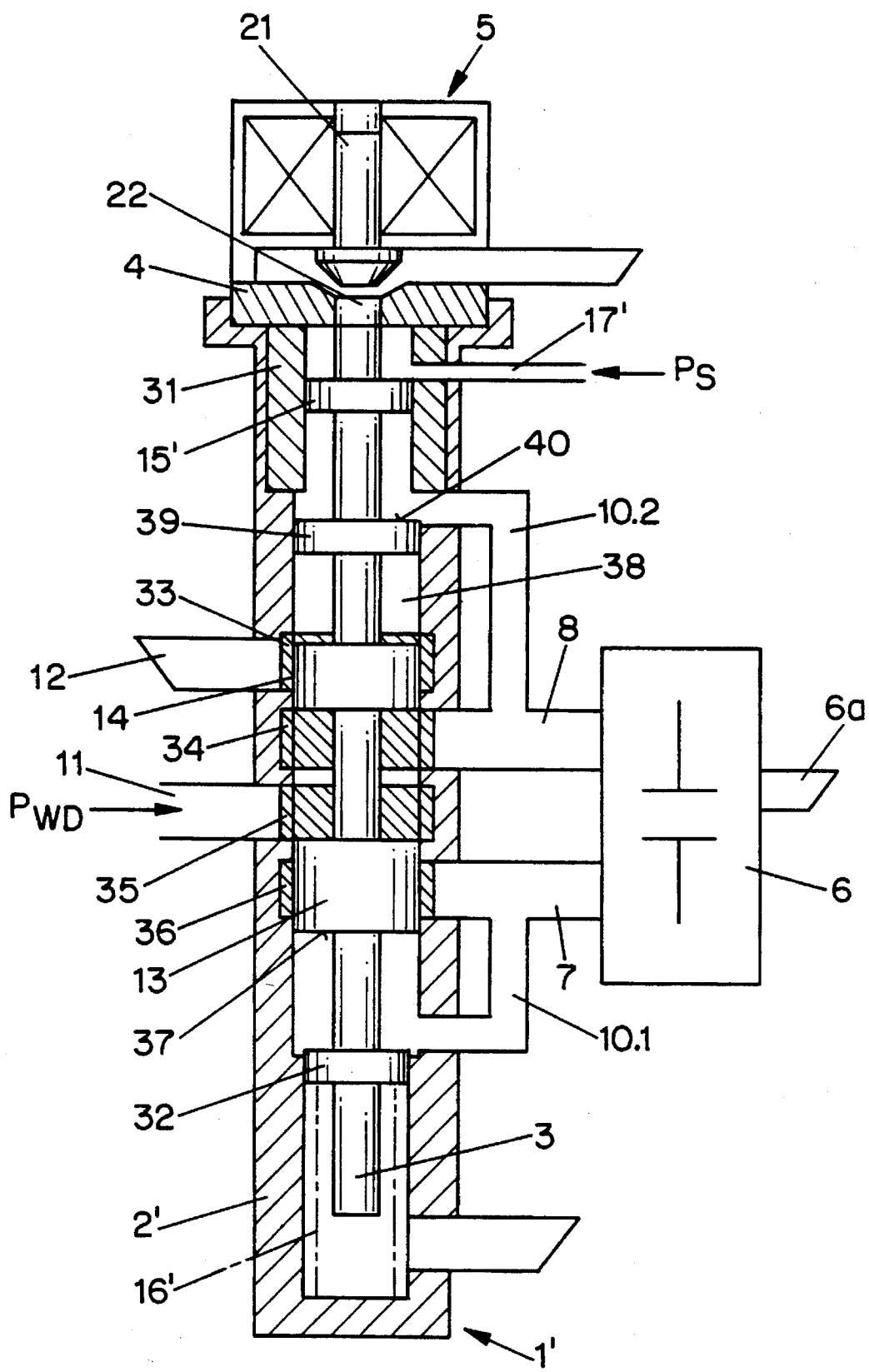
FIG. 3 is a similar view showing a third embodiment of the invention containing cushioning surfaces capable of being subjected to pressure from the opening or the closing line and illustrating the control slide in a first operating position.

The embodiment of the invention shown in FIG. 3 does not differ basically from the operating principle of the embodiments previously described. The positions of a compression spring 16' and a control pressure line 17', however, are interchanged with respect to those of the previous embodiments. In other words, in this case a third control flange 15' is subjected to pressure according to actuation of the plunger 21 and causes a displacement of a control slide 3' against the force of the compression spring 16'. Departing from the embodiments of FIGS. 1 and 2, a bushing 31 in which the third control flange 15' is guided is in this case inserted into the slide housing 2'. The control flange 15' has a smaller outside diameter than the control flanges 13 and 14 and, therefore, as with a further control flange 32 which engages the compression spring 16', requires a smaller bore than the other control flanges. In manufacturing the slide housing 2', such a configuration can be achieved only by providing an enlarged bore to accommodate a bushing at the top of the slide housing 2.

Circular slide inserts 33–36, cast into the slide housing 2 and serving to handle large fluid flow volumes in an extremely confined space, are also provided as shown by the hatched portions of FIG. 3. Moreover, in this way, the onesidedness of the incoming hydraulic fluid flow forces acting on the slide can be reduced to a minimum.

For control purposes, this embodiment also includes a branch line 10.1 leading from the closing line 7 to a first cushioning surface 37 of the flange 13 and a branch line 10.2 leading from the opening line 8 into a pressure chamber 38. The chamber 38 is bounded at the bottom by a fourth control flange 39 with an upper surface 40, as seen in the drawing, which forms a second cushioning surface. With this kind of pressure feedback to the control slide 3', the working positions of the slide 3' at various times are controlled as a function of the pressure difference between the opening line 8 and the closing line 7. In other words, by contrast with the embodiments illustrated in FIGS. 1 and 2, the points of operation are not determined primarily by the pressure $P_{WD}$, but by the differential pressure acting in the bridging clutch 6. As a result, fluctuations in the pressure PWD have no influence on the various working positions of the control slide 3'. In other words, because in this case the absolute value of the pressure $P_{WD}$ is of only subordinate importance to the mode of operation of the slide valve 1, that pressure may, if desired, have a much lower nominal value compared to the embodiments of FIGS. 1 and 2, without interfering with the function of the slide valve 1'. Reducing the pressure $P_{WD}$ can provide an improvement in efficiency for the entire system because the pump required to generate hydraulic fluid pressure (not shown) may then have especially favorable operating conditions.

The position of the control slide 3' shown in FIG. 3 corresponds to that of the control slide 3 in FIG. 1 so far as the function of the bridging clutch 6 is concerned. Analogously, the setting of the control slide 3' as shown in FIG. 4 corresponds to the setting of the slide shown in FIG. 2.

Figure 4:
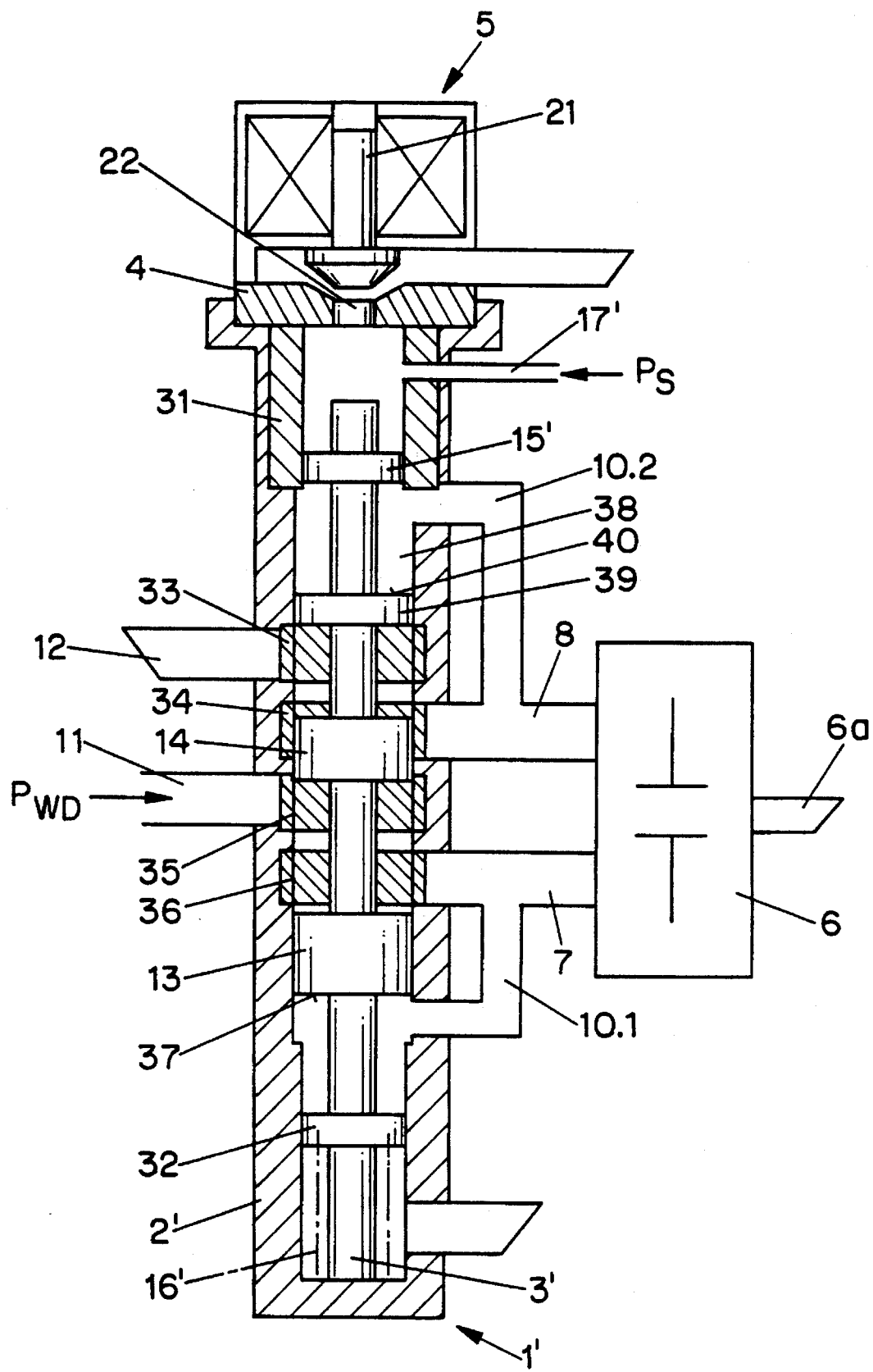
FIG. 4 is a view of the embodiment of FIG. 3 with the control slide in a second operating position.

The embodiment shown in FIGS. 3 and 4 not only permits a very compact structure, but also is easy to fabricate.

Figure 6:
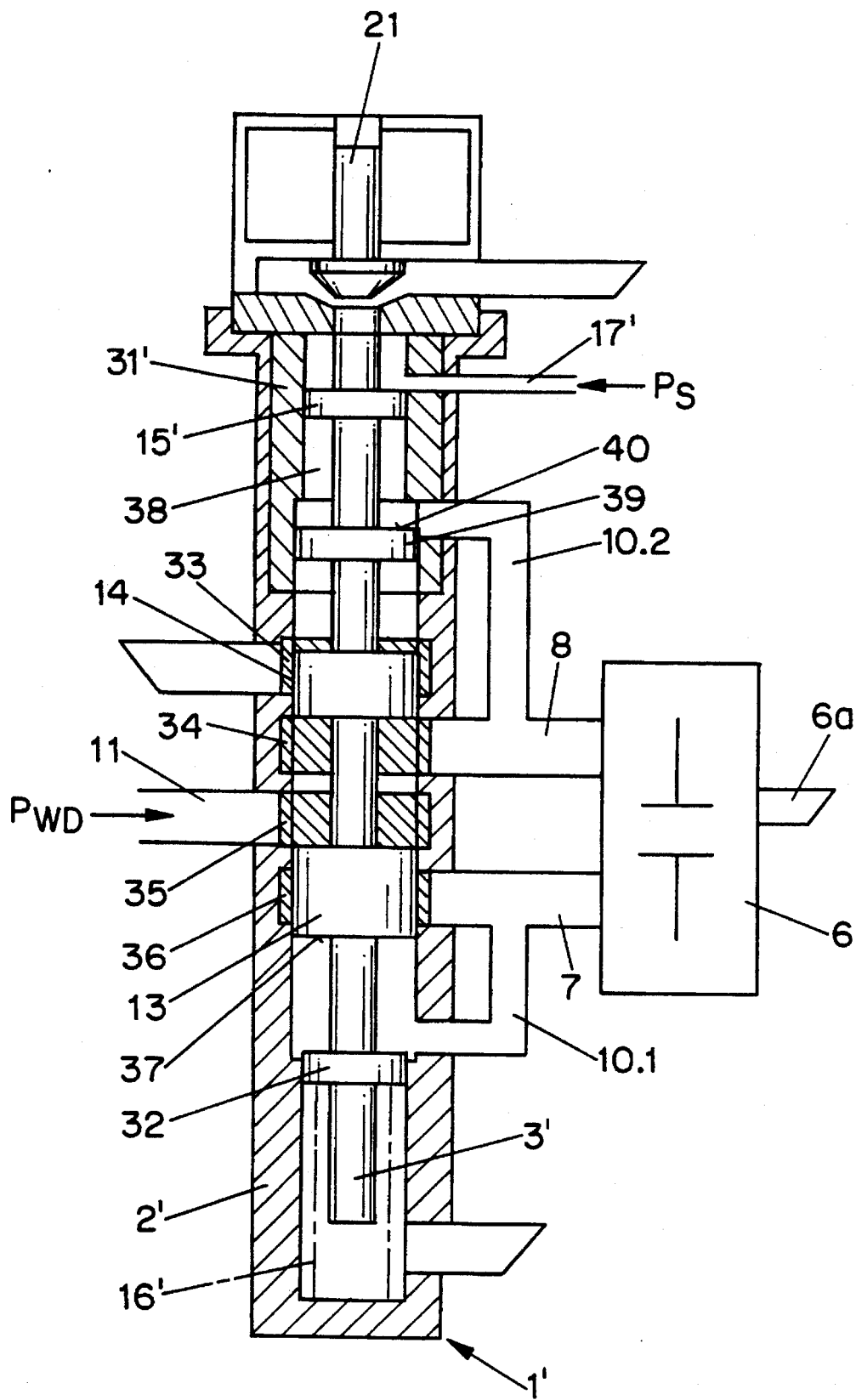
FIG. 6 is a similar view showing another representative embodiment of the invention in which the control slide is separated into two parts.

To avoid binding of the control slide in the housing, a structural variation shown in FIG. 6 has been found especially advantageous, in which a mechanical separation of the control slide 3' between the control flanges 14 and 39 into two separate top and bottom slide portions has been effected. The two control flanges 14 and 39 are both guided in a correspondingly lengthened bushing. Thus, even if the bushings for the top and bottom portions of the slide are out of alignment because of manufacturing tolerances, an unimpaired function of the composite control slide 3' is assured.

Figure 5:
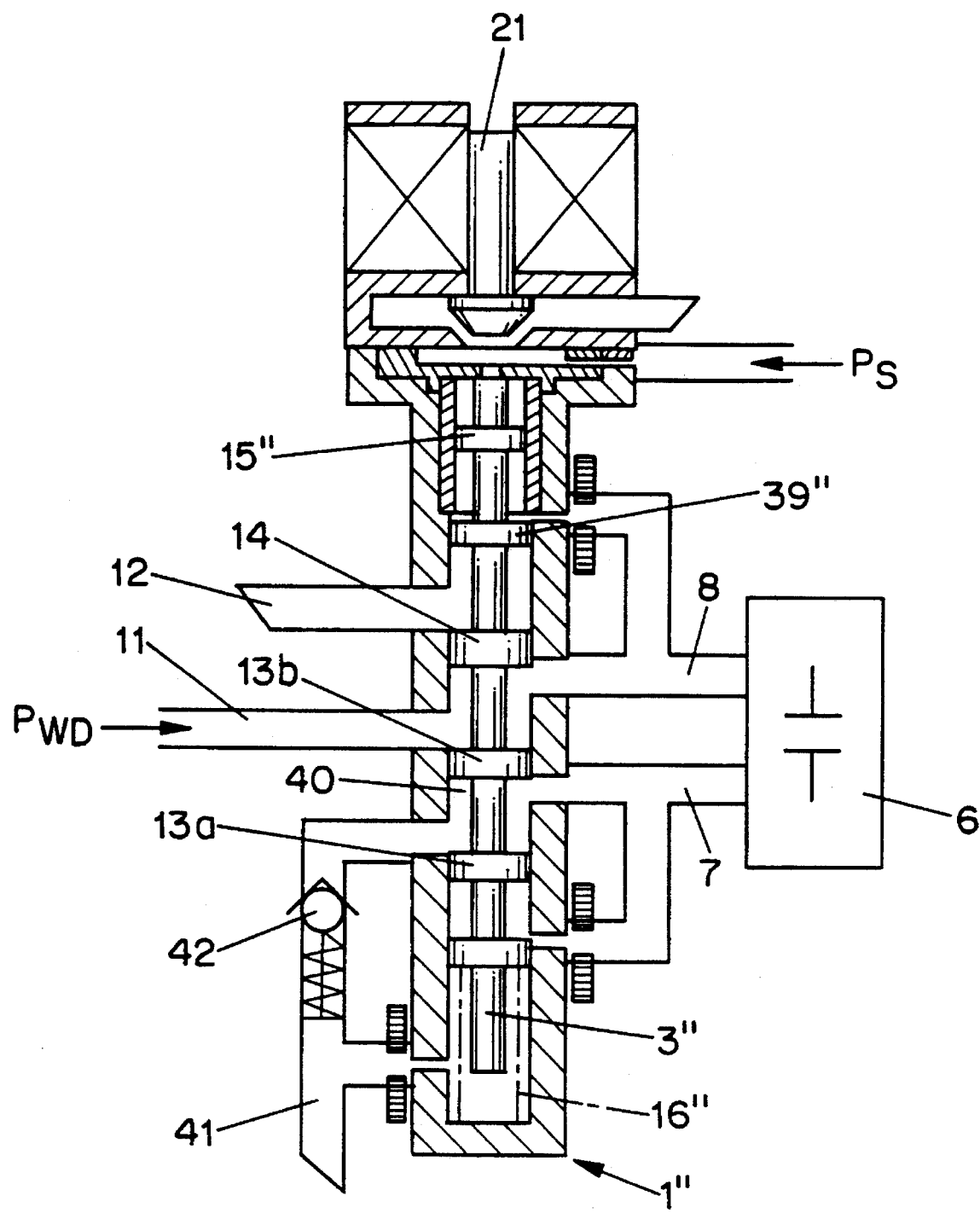
FIG. 5 is a similar view showing a fourth embodiment of the invention which is similar to the third embodiment, but having an additional drain and a modified first control flange.

The embodiment of a slide valve 1" illustrated in FIG. 5 is modified with respect to the embodiment of FIG. 3 in that the first control flange 13 of that embodiment is divided into two flanges 13a and 13b by an intervening control space 40. This results in a bipartite composite control flange having spaced portions 13a and 13b. By providing the control space 40, the closing line 7 is selectively connectable to the pressure supply port 11 or to an additional drain 41 leading to the hydraulic fluid sump. In the drain 41, there is a pressure relief valve 42 with a spring which is selected so that the relief valve will be opened by the hydraulic pressure medium when the torque converter is active, but which is strong enough so that the relief valve will prevent the torque converter from emptying during inactive periods.

The position of the control slide 3" illustrated in FIG. 5 subjects the bridging clutch 6 to the converter pressure $P_{WD}$ from the pressure supply port 11 by way of the opening line 8. The hydraulic pressure medium then passes through the bridging clutch 6, which is thus actuated in the opening direction, and then through the closing line 7, the control space 40 and the additional drain 41 by way of the residual pressure valve 42 into the sump (not shown).

To actuate the bridging clutch 6 in the closing direction, the plunger 21, actuated by current in the electromagnet, is moved into the closing position, so that the control pressure $P_S$ is applied through an aperture in the pressure plate to the third control flange 15", forcing the control slide 3" downwardly as seen in the drawing against the force of the compression spring 16". In this way, the converter pressure $P_{WD}$ is diverted directly to the closing line 7 by the second control flange 14 and the first control flange portion 13b. After passing through the bridging clutch 6, the pressure medium then passes through the opening line 8 between the second control flange 14 and the fourth control flange 39" into the drain port 12. As described previously, the flow through the bridging clutch 6 takes place with the aid of a small orifice provided in a conventional actuating piston in the bridging clutch.

By providing the switch valve 1", it is possible to employ no more than two connections for the torque converter containing the bridging clutch 6. Such elimination of the third connection 6a of the other embodiments permits the structure of the torque converter to be even smaller without the need to sacrifice the high functional capability attainable with the slide valves 1 and 1'.

The invention is not limited to the embodiments illustrated in the drawings. For example, slide valves might be provided in which the several features of the embodiments discussed above are differently combined with each other. Thus, for example, FIG. 5 combines the basic concept of the control slide of the embodiments of FIGS. 3 and 4 with the supply of control pressure $P_S$ as used in the embodiments of FIGS. 1 and 2. Accordingly, all such variations and modifications are included within the intended scope of the invention.

We claim:

1. A slide valve for controlling a torque converter bridging clutch in an automatic transmission for a motor vehicle comprising a slide housing having at least one pressure supply port in the housing, at least one drain port leading to a hydraulic fluid sump, a first connection for a closing line leading to the torque converter bridging clutch, a second connection for an opening line leading to the torque converter bridging clutch, a control slide movable in the slide housing and controlling the opening and closing of the first and second connections and the pressure supply and drain ports and having a first control flange for opening and closing the first and second connections for connecting the pressure supply port to the closing line or the opening line separately at an extreme position of the control slide or simultaneously at an intermediate position of the control slide and a second control flange for connecting the opening line to the drain port and an electromagnetic valve for controlling the position of the control slide.

2. A slide valve according to claim 1 including a pressure plate forming at least part of a pressure chamber having at least one passage orifice to connect the pressure chamber to a pressure line.

3. A slide valve according to claim 2 including an electromagnet valve mounted on the pressure plate.

4. A slide valve according to claim 3 wherein the electromagnet valve and the pressure plate form a common pressure chamber.

5. A slide valve according to claim 4 including a control pressure chamber within the slide valve housing for applying pressure to move the control slide against the force of the compression spring and including a pressure line connecting the common pressure chamber to the control pressure chamber.

6. A slide valve according to claim 2 wherein the pressure plate includes a second orifice to receive a control pressure.

7. A slide valve according to claim 1 wherein the control slide includes a third control flange having a diameter greater than that of the first and second control flanges.

8. A slide valve according to claim 2 wherein the compression spring engages a third control flange on the slide valve having a diameter greater than that of the first and second control flanges.

9. A slide valve according to claim 1 wherein the first control flange has a surface facing away from the pressure supply port which forms a first cushioning surface for receiving pressure from the closing line.

10. A slide valve according to claim 9 wherein the control slide includes a second cushioning surface for receiving pressure from the opening line and located on a side of the second control flange away from the first control flange.

11. A slide valve according to claim 10 including an additional control flange containing the second cushioning surface.

12. A slide valve according to claim 1 wherein the control slide comprises two separate parts.

13. A slide valve according to claim 1 including an additional drain and wherein the first control flange is formed with a control space through which the closing line is selectively connectable to the pressure supply port or to the additional drain, depending on the position of the control slide.

14. A slide valve according to claim 13 including a pressure relief valve which opens to the hydraulic fluid sump at a predetermined minimum pressure arranged in the additional drain.

15. A slide valve according to claim 2 including a compression spring extending between the control slide and a side of the pressure plate opposite from the pressure chamber.

* * * * *